(12) United States Patent
Goldstein

(10) Patent No.: US 6,645,444 B2
(45) Date of Patent: Nov. 11, 2003

(54) METAL NANOCRYSTALS AND SYNTHESIS THEREOF

(75) Inventor: Avery N. Goldstein, Huntington Woods, MI (US)

(73) Assignee: Nanospin Solutions, Solana Beach, CA (US)

( * ) Notice: Subject to any disclaimer, the term of this patent is extended or adjusted under 35 U.S.C. 154(b) by 0 days.

(21) Appl. No.: 09/895,942

(22) Filed: Jun. 29, 2001

(65) Prior Publication Data

US 2003/0008145 A1 Jan. 9, 2003

(51) Int. Cl.$^7$ .............................. C01G 1/00; C01G 3/00
(52) U.S. Cl. ............................. 423/1; 423/23; 423/265; 423/266; 75/10.62; 75/370; 75/371; 75/373
(58) Field of Search .............................. 423/1, 23, 265, 423/266; 75/370, 371, 373, 10.62

(56) References Cited

U.S. PATENT DOCUMENTS

| | | | | |
|---|---|---|---|---|
| 5,332,646 A | * | 7/1994 | Wright et al. | 430/137 |
| 5,453,297 A | | 9/1995 | Dye et al. | 427/217 |
| 5,925,463 A | | 7/1999 | Reetz et al. | 428/402 |
| 5,928,405 A | | 7/1999 | Ranade et al. | 75/337 |
| 5,997,958 A | | 12/1999 | Sato et al. | 427/468 |
| 6,103,868 A | * | 8/2000 | Heath et al. | 528/482 |
| 6,262,129 B1 | * | 7/2001 | Murray et al. | 516/33 |
| 6,277,740 B1 | | 8/2001 | Goldstein | |
| 6,436,167 B1 | * | 8/2002 | Chow et al. | 75/371 |
| 6,455,746 B1 | | 9/2002 | Dubois et al. | |

OTHER PUBLICATIONS

PCT International Search Report dated Dec. 16, 2002 corresponding to PCT US02/26378.
Dubois et al. Documents No. 130:254063 from WO 9915271.
Robert W. Zehner et al. "Electroless Deposition of Nanoscale Copper Patterns via Microphase–Separated Diblock Copolymer Templated Self–Assembly" Langmuir 1999, 15, 6139–6141.
Francis P. Zamborini et al. "Spectroscopic, Voltammetric, and Electrochemical Scanning Tunneling Microscopic Study of Underpotentially Deposited Cu Corrosion and Passivation with Self–Assembled Organomercaptan Monolayers" Langmuir 1998, 14, 640–647.
Paul E. Laibinis et al. "w–Terminated Alkanethiolate Monolayers on Surfaces of Copper, Silver, and Gold Have Similar Wettabilities" J. Am. Chem. Soc. 1992, 114, 1990–1995.
Nobuo Kawahashi et al. "Copper and copper compounds as coatings on polystyrene particles and as hollow spheres" J. Mater. Chem. 2000, 10, 2294–2297.
P.A. Montano et al. "Structure of Copper Microclusters Isolated in Solid Argon" Physical Review Letters May 12, 1986, vol. 56, No. 19, 2076–2079.
T. Vossmeyer et al. "Combinatorial approaches toward patterning nanocrystals" J. Appl. Phys. Oct. 1, 1998, vol. 84, No. 7, 3664–3670.
Dirk L. Van Hyning et al. "Silver Nanoparticle Formation: Predictions and Verification of the Aggregate Growth Model" Langmuir 2001, 17, 3128–3135.
P.J. Durston et al. "Scanning tunneling microscopy of ordered coated cluster layers on graphite" Appl. Phys. Lett. Nov. 17, 1997, 71 (20) 2940–2942.
Toshihiko Sato et al. "Single electron transistor using a molecularly linked gold colloidal particle chain" J. Appl. Phys. Jul. 15, 1997, 82(2) 696–701.
N. Arul Dhas et al. "Synthesis, Characterization, and Properties of Metallic Copper Nanoparticles" Chem. Mater. 1998, 10, 1446–1452.
H.H. Huang et al. "Synthesis, Characterization, and Nonlinear Optical Properties of Copper Nanoparticles" Langmuir 1997, 13, 172–175.
Chanel K. Yee et al. "Novel One–Phase Synthesis of Thiol–Functionalized Gold, Palladium, and Iridium Nanoparticles Using Superhydride" Langmuir 1999, 15, 3486–3491.
P. Sawant et al. "Alkyl Xanthates: New Capping Agents for Metal Colloids. Capping of Platinum Nanoparticles" Langmuir 2001, 17, 2913–2917.
P. Chen et al. "Synthesis of Cu Nanoparticles and Microsized Fibers by Using Carbon Nanotubes as a Template" J. Phys. Chem. B Jun. 3, 1999, vol. 103, No. 22, 4559–4561.
R.A. Salkar et al. "Elongated Copper Nanoparticles Coated with a Zwitterionic Surfactant" J. Phys. Chem. B 2000, 104, 893–897.
Arnim Henglein "Formation and Absorption Spectrum of Copper Nanoparticles from the Radiolytic Reduction of Cu(CN)2–" J. Phys. Chem. B 2000, 104, 1206–1211.

* cited by examiner

*Primary Examiner*—H. Thi Le
(74) *Attorney, Agent, or Firm*—Gifford, Krass, Groh, Sprinkle, Anderson & Citkowski, P.C.

(57) ABSTRACT

A process for forming metal nanocrystals involves complexing a metal ion and an organic ligand in a solvent and introducing a reducing agent to reduce a plurality of metal ions to form the metal nanocrystals associated with the organic ligand. The nanocrystals are optionally doped or alloyed with other metals.

27 Claims, No Drawings

METAL NANOCRYSTALS AND SYNTHESIS THEREOF

FIELD OF THE INVENTION

The present invention relates to metal nanocrystals and the synthesis thereof, and more particularly to soluble metal nanocrystals and a scalable synthesis therefor.

BACKGROUND OF THE INVENTION

Metal nanocrystals are widely used as catalysts, and are increasingly being explored as single electron devices, self-assembled monolayers, and thin film precursors. A limitation on the applications of metal nanocrystals is the impracticality of scaling existing syntheses to an industrial scale. Cluster deposition in vacuum is characterized by low throughput, difficulty in stabilizing nanocrystals towards coalescence, and complex synthetic systems. (P. Jensen, *Reviews of Modern Physics*, 71(5), (1999) 1695–1734). Colloidal syntheses of metal nanocrystals are well established, yet suffer from low yields per volume and difficulty in removing colloidal stabilizers after synthesis. An early preparation for colloidal metal includes combination of a dilute solution of hydrazine hydrate (1:2000) with an ammoninical copper sulfite solution (1:1000) in the presence of gum arabicum. Careful heating yields a hydrosol which after four days of dialysis against distilled water yields a hydrosol that is red in reflection and blue in optical transmission (A. Gutbeir, G. Hoffineyer, Z. *Anorg. Allgem. Chem.*, 44, (1905) 227). Other colloidal syntheses have developed that retain the characteristics of low concentration and a polymeric or surfactant stabilizer. (H. H. Huang et al., Langmuir, 13 (1997) 172–175; I. Lisiecki and M. P. Pileni, *J. Phys. Chem.*, 99 (14) (1995) 5077–5082; and Nanoparticles and Nanostructured Films, J. H. Fendler, Wiley-VCH, 1998, Chapter 4.) Shuttle molecules have also been employed to transfer metal ions to an organic phase prior to reduction in the presence of a solubilizing passivating agent. While this method is attractive for producing metal ions from an otherwise acidic acid solution, the cost of shuttle molecules such as tetraalkyl ammonium salts is considerable. (Brust et al., *J. Chem. Soc. Commun..* (1994) 801.) An additional group of metal nanocrystal syntheses has used an organic reducing agent as a ligand to complex a metal ion intended for reduction. While such methods produce good yields of metal nanoparticulate, such methods are characterized by particle agglomeration. (N. Arul Dhas et al., *Chem. Mater.* 10 (1998) 1446–1452.)

The ability to produce economically large quantities of metal nanocrystals that are soluble in a given solvent affords numerous opportunities to develop novel catalytic and materials systems. Thus, there exists a need for a metal nanocrystal synthesis that affords soluble nanocrystals by a process that is readily scalable to produce gram and kilogram quantities.

SUMMARY OF THE INVENTION

A process for forming metal nanocrystals includes the steps of complexing a metal ion and an organic ligand in a first solvent and introducing a reducing agent to reduce a plurality of metal ions to form the metal nanocrystal associated with the organic ligand. The organic ligand has the formula A—L—(Q)$_n$ or

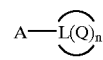

where L is $C_1$ to $C_{30}$ alkyl, $C_5$ to $C_{30}$ cycloalkyl, $C_2$ to $C_{30}$ alkenyl, $C_6$ to $C_{30}$ cycloalkenyl, $C_6$ to $C_{40}$ aromatic; Q is a heteroatom containing moiety capable of coordinating a metal ion, the heteroatom including oxygen, nitrogen or sulfur; the heteroatom being present as an alcohol, carbonyl, carboxyl, phosphatidyl, sulfonyl, sulfinyl, nitrosyl, amino, imido, azide, thiol, ester, ether, secondary amino, thioester, thioether, silanol, siloxyl; and A is a solubility imparting moiety illustratively including hydrogen, alcohol, sulfonyl, sulfhydryl, amino, secondary amino, phosphatidyl, carboxyl, phenyl, nitro-, ester, ether, thioester and thioether; n is an integer between 1 and 4. A process for forming a copper containing crystal in particular includes the steps of forming a complex between a copper ion and an organic ligand in a solvent and introducing a reducing agent illustratively including hydrogen gas, hydrides and hydrazines to reduce the copper ions to form a copper nanocrystal associated with the organic ligand. Optionally, the ligand is chosen to impart solubility on the copper nanocrystal associated therewith in a second solvent immiscible with the reaction solvent so as to transport the copper nanocrystals into the second solvent and thereby leave the reaction byproducts in the reaction solvent. A solution includes a plurality of copper nanocrystals having an average domain size in between 1 and 50 nanometers, each nanocrystal having a surface passivated with an organic ligand having a molecular weight of less than 400 atomic units and a solvent having an affinity for a portion of the ligand extending from the copper nanocrystal surface.

DETAILED DESCRIPTION OF THE PREFERRED EMBODIMENTS

The present invention provides a reductive synthesis of a metal ion complex where the metal ion complex ligands following reaction serve to prevent agglomeration and impart solubility to the resulting metal nanocrystal. The resulting metallic nanocrystals preferably form kinetically stable solutions, in contrast to suspensions.

As used herein, "nanocrystal" defines a crystalline domain having dimensions along at least one axis of between 1 nanometer and 100 nanometers.

As used herein, "solubility" is defined as a substance dispersed in a liquid that is able to pass through a 0.2 micron filter and remain in the liquid for 24 hours after centrifugation at 7000 rpm for ten minutes.

A process for forming metallic nanocrystals according to the instant invention includes forming a complex between a metal ion and an organic ligand in a solvent. It is appreciated that the entire coordination sphere of the metal ion need not be filled by organic ligands; rather, spectator ions, solvent molecules and solvent ions may also form coordinate bonds to the metal ion. A reducing agent is then introduced to the metal ligand complex. The reducing agent is selected to have an electrochemical potential sufficient to reduce the metal ion from a positive oxidation state to a zero oxidation state metal atom or produce metal hydrides that in turn reduce to zero oxidation state metals. The result of metal ion reduction in the presence of the organic ligand-metal ion complex is the formation of a metal nanocrystal having associated therewith the organic ligand. The association of the organic ligand with the metal nanocrystal arrests nanocrystal growth, limits nanocrystal agglomeration, and preferably is selected to impart solubility on the resulting nanocrystal.

According to the present invention a metal nanocrystal is formed of a metallic element including beryllium, magnesium, aluminum, scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, antimony, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, thallium, lead, bismuth, polonium, thorium, protactinium, uranium, neptunium, and plutonium. Typically, an inorganic metal salt is chosen as the source of metal ions for reduction to form a nanocrystal. The choice of metal ion counter anion largely being dictated by solubility and compatibility with the solvent. Metal ion counter anions operative herein illustratively include halides, such as fluoride, chloride, bromide and iodide; nitrate; phosphate; perchlorate; formate; acetate; borate; hydroxide; silicate; carbonate; sulfite; sulfate; nitrite; phosphite; hydrates thereof; and mixtures thereof.

It is appreciated that a plurality of different metal ions are reduced simultaneously so as to form a metal alloy or metal ion doped metal nanocrystal, provided the predominant metal ion reagent based on atomic percent is present as a metal ion ligand complex. A dopant metal ion typically is uncoordinated and reduced in concert with the predominant metal ion-ligand complex. The dopant metal typically being present from 0.05 to 49 atomic percent of the total metal content of a nanocrystal. Preferably, the dopant metal is present from 0.5 to 5 atomic percent of the total metal present.

The total metal ion is typically present at a concentration of 0.01 to 1 molar. The concentration of the metal ion is dictated by factors illustratively including metal ion-counter ion solubility in the solvent, and desired nanocrystal size.

The solvent chosen for the formation of the metal ion ligand complex is dictated not only by reagent solubility, but also the stability of a zero oxidation state metal nanocrystal in the solvent. Thus, while water and water containing organic solvents are operative in the synthesis of most metal nanocrystals, those metals that readily form stable hydroxides or oxides are better synthesized in anhydrous organic solvents such as methanol, isopropanol, higher alcohols, ethers, and the like. It is appreciated that degassing of solvents and the synthesis of metal nanocrystals often requires exclusion of oxygen by performing reactions under an inert atmosphere illustratively including nitrogen, argon, and helium.

A ligand operative in the instant invention is any organic species capable of forming a coordinate covalent bond to a given metal ion. Suitable ligands for forming a complex with a given metal ion are well known to the art as detailed in Chemistry of the Elements, $2^{nd}$ Ed., 1997 by N. N. Greenwood and A. Earnshaw, Butterwerth-Heinemann, Oxford, UK; Principles and Applications of Organotransition Metal Chemistry, 1987 by J. Collman et al., University Science Books, Mill Valley, Calif.; and Organic Sequestering Agents, S. Chaberek and B. E. Martell, 1959, Wiley, N.Y. A ligand operative in the present invention has a formula A—L—$(Q)_n$ where L is $C_1$ to $C_{30}$ alkyl, $C_5$ to $C_{30}$ cycloalkyl, $C_2$ to $C_{30}$ alkenyl, $C_6$ to $C_{30}$ cycloalkenyl, $C_6$ to $C_{40}$ aromatic; Q is a heteroatom containing moiety capable of coordinating a metal ion, the heteroatom including oxygen, nitrogen or sulfur; the heteroatom being present as an alcohol, carbonyl, carboxyl, phosphatidyl, sulfonyl, sulfinyl, nitrosyl, amino, imido, azide, thiol, ester, ether, secondary amino, thioester, thioether, silanol, siloxyl; and A is a solubility imparting moiety illustratively including hydrogen, alcohol, sulfonyl, sulfhydryl, amino, secondary amino, phosphatidyl, carboxyl, phenyl, nitro-, ester, ether, thioester and thioether; n is an integer between 1 and 4 and corresponding to mono through tetradentate ligands. In a preferred embodiment, L is alkyl. It is further appreciated that in each occurrence of Q in a polydentate ligand, Q is independently selected from the heteroatoms oxygen, nitrogen and sulfur. In a preferred embodiment, a polydentate ligand has at least two different heteroatoms Q. For example, a first occurrence of Q is an amine nitrogen and a second occurrence an alcohol oxygen leading to a preferential association of one heteroatom metal ion bond upon reduction. While the identity of a heteroatom containing coordinating group Q and a solubility imparting moiety A may in some instances be the same, A is differentiated in such an instance from Q in not being coordinated to a metal ion owing to steric effects. It is appreciated that the ligand may also be a cyclic

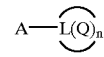

incorporating the heteroatom containing group Q therein, where the identity of A, L, Q, and n are the same as provided above. Cyclic ligands illustratively include tetrahydrofuran, thiophene, pyridine, piperazine, lactones, diazoles, triazoles, thiazoles and sugars. A limitation on the ligand is that the resulting complex remain susceptible to reduction to a zero oxidation state metal atom. Preferably, the ligand has a molecular weight of less than 400 atomic units. The identity of Q to form successfully a ligand metal ion complex depends on the bonding characteristics of Q relative to the metal ion and the zero oxidation state metal atom. While the metal ion ligand complex must have a metal ion —Q bond weak enough to allow action of the reducing agent on the metal ion, Q must also have an affinity for zero oxidation state metal atoms on the nanocrystal surface. Bond strengths of Q and a metal ion or the zero oxidation state metal formed after ion reduction are readily obtained for a given ligand-metal ion system by ab initio calculations using GAUSSIAN® program, predicted from bond dissociation or mean bond energies derived from thermochemical data. (CRC Handbook of Chemistry and Physics, $76^{th}$ Ed. (1995) 9-15–9-63).

It is appreciated that a multiple ligand system is operative herein with a first ligand selectively binding a metal ion whereas a second ligand preferentially associated with the zero oxidation state metal atoms arrayed on the nanocrystal surface after reduction. By way of example, many main group metal ions form operative amine complexes which are better stabilized as zero oxidation state metals by sulfur or oxygen. Specifically, a $Cu^{2+}$ complex where Q is a primary amine includes a second ligand where Q is an alkyl thiol or thioester. The sulfur containing ligand displaces the amine in stabilizing the resulting copper nanocrystal. It is further appreciated that a multiple ligand system need not have all ligands soluble in the same solvent; rather, the metal ion complexing ligand while forming a stable complex with the metal ion only forms a transiently stable association with the resulting nanocrystal that imparts solubility properties on the nanocrystal to transport the nanocrystal into an immiscible second solvent layer containing the ultimate nanocrystal passivating second ligand that preferentially displaces the first metal ion ligand.

The ratio of metal ion to ligand molecules is dependent on factors illustratively including desired nanocrystal size, the value of n, the steric bulk of a ligand, and the ability of a metal-ligand bond to survive following metal ion reduction. The atomic ratio of metal ions to heteroatoms containing coordinate groups Q range from 1:0.10 to 1:6. It is appreciated that facile ligands in the synthesis of smaller size nanocrystals favor a high ratio of ligand to metal ions. For a monodentate ligand, a metal to ligand ratio is preferably between 1:0.5 and 1:4.

Often, upon introducing a ligand to a metal ion solution, the resulting complex is insoluble and forms a precipitate. Such a complex precipitate is equally operative herein with a soluble metal ion-ligand complex provided the precipitate is suspendable in solvent.

A reducing agent is added to a metal ion-ligand complex solution or suspension to reduce the metal ion to a zero oxidation state. The combining of a plurality of zero oxidation state metal ions associated with ligands affords the inventive metal nanocrystals. A reducing agent operative herein is a $H^-$ transfer reagent or an electrochemical potential greater than the reduction potential of the metal ion to be reduced. (CRC Handbook of Chemistry and Physics, $76^{th}$ Ed. (1995) 8-26–8-31, CRC Press, Boca Raton, Fla. ). Generally, main group metal ions are readily reduced by water and alcohol soluble reducing agents illustratively including hydrazine, sodium borohydride and lithium aluminum hydride. Additionally, bubbling of a gaseous reducing agent through a suspension or solution of metal ion-ligand complex, or the addition of a reactive metal under anhydrous conditions is also operative herein. It is appreciated that reactive metal reducing agents offer a larger electrochemical potential needed to reduce some metal ions as per the electrochemical series. In instances where alternative reducing agents have the necessary electrochemical potential to drive a metal ion reduction, a solution of hydrazine or sodium borohydride is preferred. However, the preferred reducing agents are not compatible with acidic solutions and in such instances, hydrogen is the preferred reducing agent. More preferably, the reducing agent is added in excess to assure complete reduction of metal ions to zero valence metal.

While the size of metal nanocrystals formed can vary from 1 nanometer to 100 nanometers in size, the preferred nanocrystal domain size is between 1 nanometer and 8 nanometers to take advantage of the high surface area to volume ratio associated with particulate in this size regime. As such, metal nanocrystals as produced herein have utility as catalysts, precursors for thin films, single electron devices, sensors, biomedical markers, and in the case of radioactive metals, higher radiative flux fission sources.

In a preferred embodiment, a second solvent, immiscible with the metal ion solution, is added thereto. The second solvent is chosen such that the portion of the ligand molecule terminal to the metal nanocrystal when associated therewith is attractive to the solvent. For example, an alkyl chain extending from a heteroatom bound to a metal nanocrystal surface is attractive towards a lipophilic solvent such as an alkane, ether or toluene thereby imparting solubility on the passivated metal nanocrystal.

Having described the invention, the following illustrative examples are provided which are not intended to limit the scope of the invention.

EXAMPLE 1

0.0837 grams of copper chloride dihydrate is dissolved in 5.4 milliliters of water. 0.0315 grams of dodecyl amine is added thereto resulting in a blue solution and a blue flocculus. 3 milliliters of hexane is layered onto the aqueous flocculent and solution resulting in a turbid blue mixture which over time partially segregates such that the hexane phase contains some of the flocculated blue material. 8.4 milliliters of an aqueous 0.64 molar solution of sodium borohydride is added dropwise with stirring resulting in a clear, colorless aqueous solution and a reddish-brown hexane phase. The hexane phase includes a substance that does not precipitate during centrifugation at 7000 rpms for ten minutes and is capable of passing a 0.2 micron filter. The material corresponds to copper nanocrystals having an average particle size of 3 nanometers. Upon drying under an inert atmosphere, the resulting copper nanocrystals are readily redissolved in hexane.

EXAMPLE 2

50 milliliters of 0.1 molar aqueous copper nitrate is overlayered with 50 milliliters of hexane. 0.57 grams of sodium borohydride and 0.43 grams of hexadecyl thiol in 20 milliliters of ethanol is added dropwise thereto. A black precipitate forms at the meniscus between water and hexane. The black precipitate corresponds to 124% of the theoretical yield of copper. X-ray powder diffraction confirms the black precipitate to be copper nanocrystals having an average domain size of 12 nanometers as determined by Debye-Scherer line broadening.

EXAMPLE 3

50 milliliters of 0.1 molar aqueous copper nitrate is overlayered with 50 milliliters of diethyl ether. 0.507 grams of hexadecyl thiol is dissolved in the ether phase. 0.59 grams of sodium borohydride and 20 milliliters of water is added dropwise to form copper nanocrystals having an average domain size of 6.2 nanometers as determined by Debye-Scherer line broadening. The ether phase is a black opaque suspension containing copper nanocrystal particulate.

EXAMPLE 4

20 milliliters of 0.5 molar copper chloride in ethanol is combined with 1.27 grams benzothiazole resulting in a clear blue solution. The addition of 0.2 grams sodium borohydride in 4 milliliters of water results in the formation of a red-brown solution that corresponds to 3 nanometer soluble copper nanocrystals.

EXAMPLE 5

0.46 grams of sodium mercapto propyl sulfonate is added to 25 milliliters of 0.1 molar copper nitrate to yield a yellow solution. 0.226 grams of sodium borohydride and 10 milliliters of water is added dropwise to yield a red-brown solution containing water soluble and redissolvable copper nanocrystals. Passing the resulting solution through a silica gel column serves to separate the water soluble copper nanocrystals from the reaction byproducts.

EXAMPLE 6

0.002 moles of silver nitrate is dissolved in 30 milliliters of water to which is added 0.2 grams of dodecyl amine. 20 milliliters of hexane is layered thereover and 0.135 grams of sodium borohydride in 10 milliliters of water is added dropwise to form a black hexane layer and a clear colorless aqueous layer. The hexane layer contains soluble silver nanocrystals.

EXAMPLE 7

0.3 grams of cobalt chloride is dissolved in 20 milliliters of water to which is added 0.1 grams of sodium mercapto propyl sulfonate. 0.2 grams of 60 mesh magnesium metal is added as a reductant. The solution darkens over 2 hours from a rose color to dark red and then black. The solution contains 4 nanometer diameter cobalt nanocrystals.

EXAMPLE 8

The method of Example 7 is repeated with 0.075 grams of sodium laurate. The resulting nanocrystals formed upon reduction are hexane soluble.

EXAMPLE 9

0.05 grams of silver nitrate is added to 25 milliliters of 0.1 molar copper nitrate containing 0.13 grams of hexadecyl amine. 15 milliliters of hexane is overlayered onto the aqueous solution. The hexane containing 0.08 grams of dodecyl thiol. After dropwise addition of approximately 6 milliliters of 1.25 molar sodium borohydride and stirring approximately 1 hour, hexane soluble nanocrystals are observed in a clear, colorless aqueous phase. The resulting nanocrystals incorporate silver into the bulk copper phase in an atomic ratio consistent with the reagent ratio of copper ions to silver ions.

EXAMPLE 10

0.4 grams of nickel perchlorate is dissolved in 25 milliliters of water containing 0.1 grams of dodecyl amine. The aqueous solution is overlaid with 15 milliliters of hexane followed by the addition of 0.2 grams of 60 mesh magnesium metal. Following reduction, the hexane phase is observed to contain nickel nanocrystals while a clear, colorless aqueous phase is noted.

All references cited herein are intended to be incorporated by reference to the same extent as if each was individually and explicitly incorporated by reference.

It is appreciated that various modifications of the present invention in addition to those shown and described herein will be apparent to those skilled in the art from the above description. Such modifications are also intended to fall within the scope of the appended claims.

What is claimed is:

1. A process for forming a metal nanocrystal comprising the steps of:

forming a complex between a metal ion and an organic ligand in a first solvent solubilizing said complex; and introducing a reducing agent to said first solvent to reduce a plurality of metal ions to form a metal nanocrystal at a temperature of less than 100° C., said metal nanocrystal associated with said organic ligand.

2. The process of claim 1 wherein the metal ion is selected from the group consisting of: beryllium, magnesium, aluminum, scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, antimony, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, thallium, lead, bismuth, polonium, thorium, protactinium, uranium, neptunium, and plutonium.

3. The process of claim 1 wherein the organic ligand has the formula A—L—(Q)$_n$ or

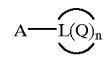

where L is $C_1$ to $C_{30}$ alkyl, $C_5$ to $C_{30}$ cycloalkyl, $C_2$ to $C_{30}$ alkenyl, $C_6$ to $C_{30}$ cycloalkenyl, $C_6$ to $C_{40}$ aromatic; Q is a heteroatom containing moiety capable of coordinating a metal ion, the heteroatom including oxygen, nitrogen or sulfur; the heteroatom being present as an alcohol, carbonyl, carboxyl, phosphatidyl, sulfonyl, sulfinyl, nitrosyl, amino, imido, azide, thiol, ester, ether, secondary amino, thioester, thioether, silanol, siloxyl; and A is a solubility imparting moiety illustratively including hydrogen, alcohol, sulfonyl, sulfhydryl, amino, secondary amino, phosphatidyl, carboxyl, phenyl, nitro-, ester, ether, thioester and thioether; n is an integer between 1 and 4.

4. The process of claim 1 wherein the molar ratio between said metal ion and said organic ligand is between 1:0.10 and 1:6.

5. The process of claim 1 wherein said reducing agent is selected from the group consisting of: hydrogen gas, sodium metal, zinc metal, magnesium metal, aluminum metal, lithium aluminum hydride, sodium borohydride, and hydrazine.

6. The process of claim 1 wherein said metal nanocrystal has a domain size of between 1 nanometer and 8 nanometers.

7. The process of claim 1 further comprising the step of extracting said metal nanocrystals from said first solvent with a second solvent.

8. The process of claim 7 wherein said second solvent is in contact with said first solvent during introduction of said reducing agent.

9. The process of claim 1 further comprising the step of removing said byproducts from said metal nanocrystals.

10. The process of claim 1 wherein said metal nanocrystal associated with said organic ligand is soluble.

11. The process of claim 1 wherein said metal nanocrystal associated with said organic ligand is suspendable.

12. The process of claim 1 wherein introduction of said reducing agent occurs under an inert atmosphere.

13. The process of claim 1 further comprising the step of adding a dopant metal ion prior to introduction of said reducing agent.

14. A process for forming a copper containing nanocrystal comprising the steps of:

complexing a copper ion and an organic ligand having a molecular weight of less than 400 atomic units in a first solvent; and introducing a reducing agent selected from the group consisting of hydrogen gas, hydrides, and hydrazines to reduce the copper ions to form a copper nanocrystal associated with said organic ligand.

15. The process of claim 14 further comprising the step of: layering a second solvent forming a meniscus with said first solvent thereon.

16. The process of claim 14 wherein said copper nanocrystal is transported into said second solvent.

17. The process of claim 14 further comprising the step of: adding a dopant metal ion prior to introduction of said reducing agent.

18. The process of claim 14 wherein the ligand is a $C_6$ to $C_{30}$ amine.

19. The process of claim 14 wherein said ligand is selected from the group consisting of organic molecules having a molecular weight of less than 400 that contain at least two heteroatoms capable of forming coordinate covalent bonds with a copper ion, said heteroatoms selected from the group consisting of oxygen, nitrogen and sulfur.

20. A solution comprising:
- a plurality of copper nanocrystals having an average domain size of between 1 and 8 nanometers, said plurality of copper nanocrystals each having a surface, the surface passivated with an organic ligand where the organic ligand has a molecular weight of less than 400 atomic units;
- a solvent having an affinity for a portion of said ligand extending from the copper nanocrystal surface; and
- a reducing agent selected from the group consisting of hydrogen gas, sodium metal, zinc metal, magnesium metal, aluminum metal, lithium aluminum hydride, sodium borohydride, and hydrazine.

21. The solution of claim 20 further comprising a second type of nanocrystal selected from the group consisting of: silver, gold, magnesium, aluminum, alloys, and doped forms thereof.

22. A copper nanocrystal comprising a crystalline copper domain having dimensions from 1 nanometer to 20 nanometers, said crystalline domain having a surface; a plurality of ligands passivating the surface, each ligand having a formula A—L—$(Q)_n$ where L is $C_1$ to $C_{30}$ alkyl, $C_5$ to $C_{30}$ cycloalkyl, $C_2$ to $C_{30}$ alkenyl, $C_6$ to $C_{30}$ cycloalkenyl, $C_6$ to $C_{40}$ aromatic; Q is a heteroatom containing moiety capable of coordinating a metal ion, the heteroatom including oxygen, nitrogen or sulfur; the heteroatom being present as an alcohol, carbonyl, carboxyl, phosphatidyl, sulfonyl, sulfinyl, nitrosyl, amino, imido, azide, thiol, ester, ether, secondary amino, thioester, thioether, silanol, siloxyl; and A is a solubility imparting moiety illustratively including hydrogen, alcohol, sulfonyl, sulfhydryl, amino, secondary amino, phosphatidyl, carboxyl, phenyl, nitro-, ester, ether, thioester and thioether; n is an integer between 1 and 4, the copper nanocrystal further comprising a metal dopant present from 0.05 to 49 atomic percent.

23. The copper nanocrystal of claim 22 wherein said copper domain has dimensions from 1.8 to 8 nanometers.

24. The copper nanocrystal of claim 22 wherein said dopant is selected from the group consisting of: gold, silver, magnesium and aluminum.

25. The copper nanocrystal of claim 22 wherein said plurality of ligands imparts solubility in a solvent to the copper nanocrystal.

26. The copper nanocrystal of claim 25 wherein said solvent is an organic solvent.

27. The copper nanocrystal of claim 22 wherein Q is sulfur.

* * * * *